Figure 1:
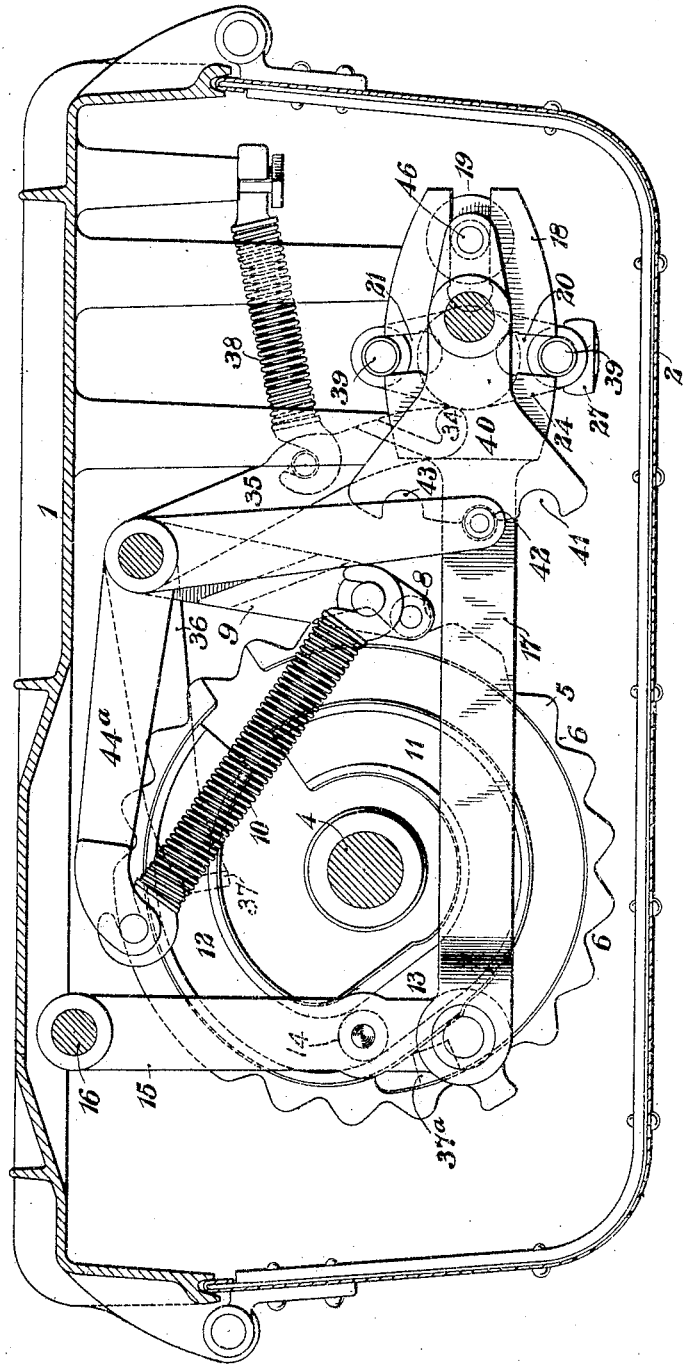

No. 780,058. PATENTED JAN. 17, 1905.
T. S. PERKINS.
CONTROLLER FOR ELECTRIC MOTORS.
APPLICATION FILED JUNE 24, 1902.

4 SHEETS—SHEET 1.

WITNESSES:
C. L. Belcher
B. B. Hines

INVENTOR
Thomas S. Perkins
BY
Wesley G. Carr
ATTORNEY

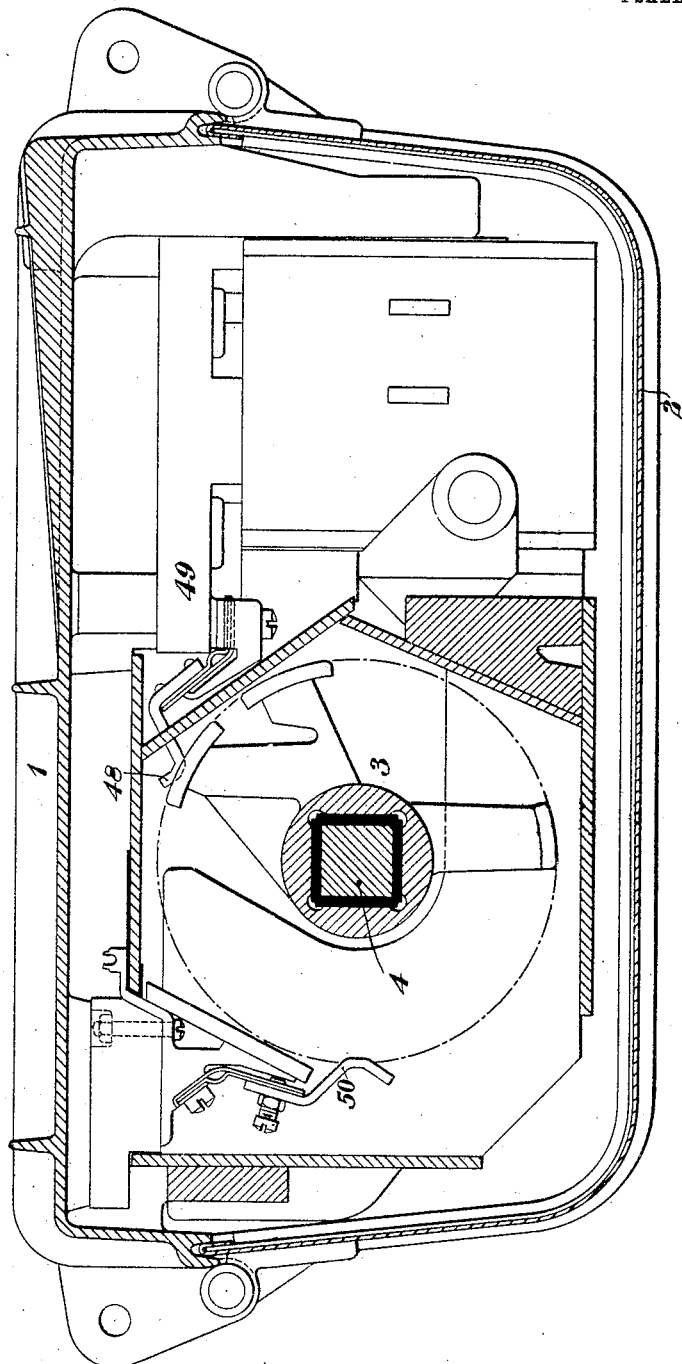

No. 780,058. PATENTED JAN. 17, 1905.
T. S. PERKINS.
CONTROLLER FOR ELECTRIC MOTORS.
APPLICATION FILED JUNE 24, 1902.
4 SHEETS—SHEET 3.
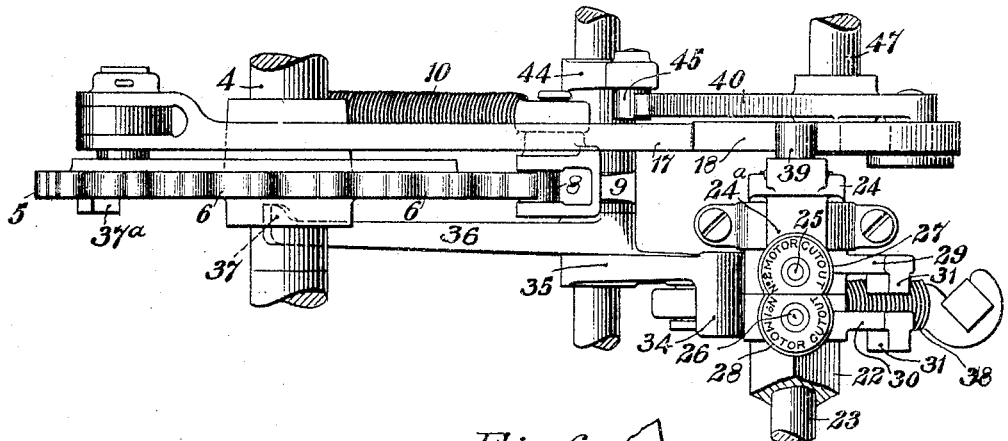
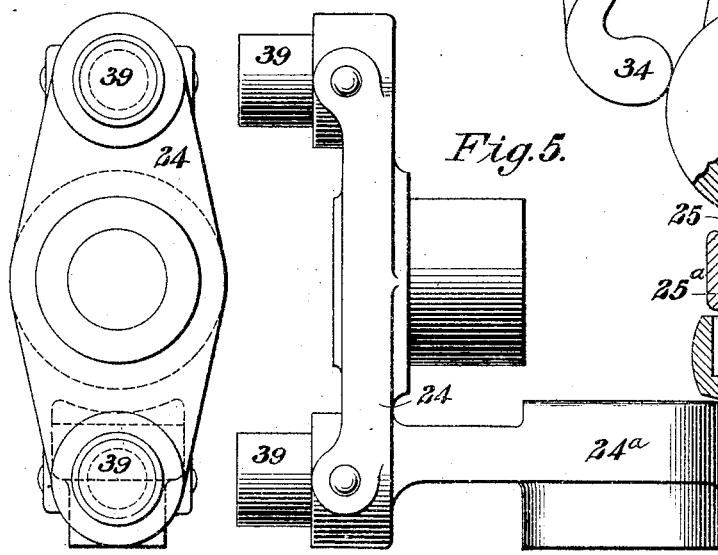
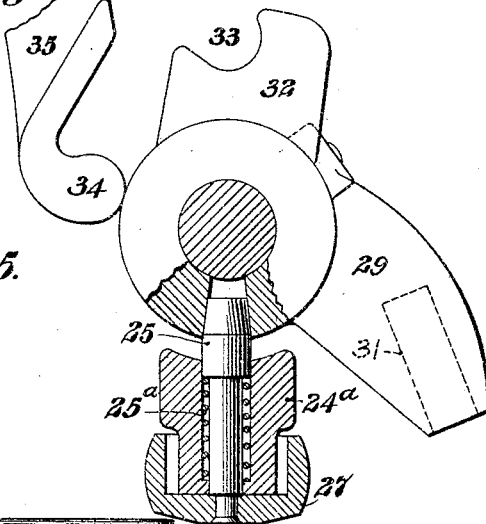
WITNESSES:
C. L. Belcher
B. B. Hines
INVENTOR
Thomas S. Perkins
BY
Wesley G. Carr
ATTORNEY

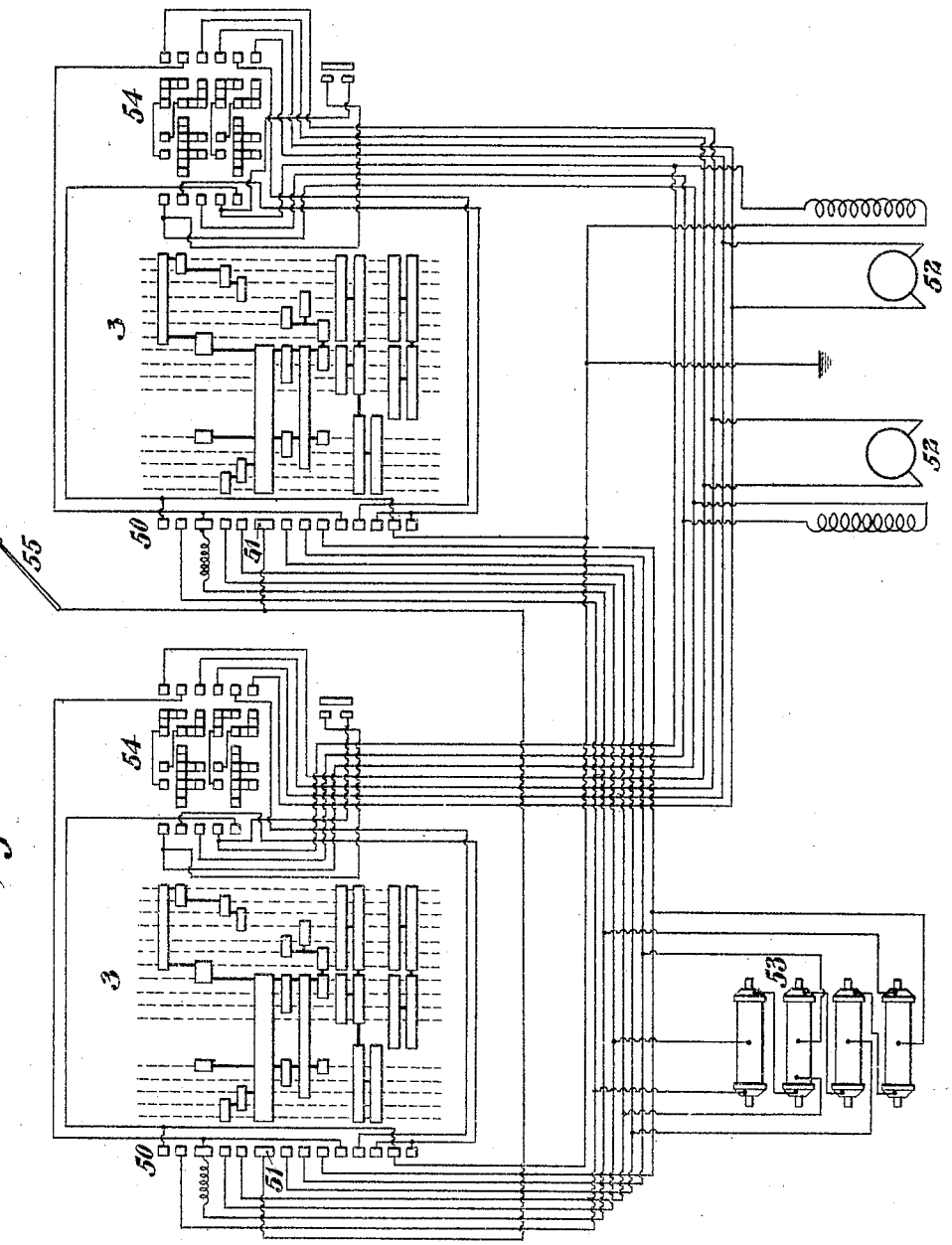

No. 780,058.                                                    Patented January 17, 1905.

UNITED STATES PATENT OFFICE.

THOMAS S. PERKINS, OF WILKINSBURG, PENNSYLVANIA, ASSIGNOR TO WESTINGHOUSE ELECTRIC & MANUFACTURING COMPANY, A CORPORATION OF PENNSYLVANIA.

CONTROLLER FOR ELECTRIC MOTORS.

SPECIFICATION forming part of Letters Patent No. 780,058, dated January 17, 1905.

Application filed June 24, 1902. Serial No. 112,957.

*To all whom it may concern:*

Be it known that I, THOMAS S. PERKINS, a citizen of the United States, residing in Wilkinsburg, in the county of Allegheny and State of Pennsylvania, have invented a new and useful Improvement in Controllers for Electric Motors, (Case No. 1,062,) of which the following is a specification.

My invention relates to controllers for electric motors; and it has for its object to provide an improved controller of that kind in which the movement of the controller-handle from the zero or position of rest in the direction reverse to that in which power is applied automatically operates the reversing-switch to connect the motors in a local braking-circuit and varies the resistance in such circuit. Controllers of this general character are now well known, and the present invention comprises various improvements in details of their construction.

An important feature of the invention consists in the improved mechanism for connecting the controller-drum with the reversing-switch, whereby when the controller-handle is moved from one of the power positions to one of the braking positions the reversing-switch is operated to reverse the motor connections. The said mechanism also acts to prevent movement of the reversing-handle, except at those times when the controller-handle is in the zero or "off" position.

Another feature of the invention consists in the arrangement for cutting out either of the motors when desired.

Further improvements relate to the location and arrangement of the fixed contact-fingers, that finger which is connected to the wire transmitting the current being located between two fingers which are connected to the resistance and remote from the grounded parts of the controller, so that injury to the controller in case of grounds or short circuits is prevented. The contact-fingers are also so constructed and arranged that their pivotal points are in a plane which is approximately tangential to the surface of the drum at the points which are in contact with the fingers, thus insuring substantial freedom from buckling action of the fingers in case the coöperating contact-surface on the drum becomes beaded or otherwise roughened in service. The equalizing-fingers are furthermore arranged so as to be connected directly to one of the binding-posts of the terminal board.

In the accompanying drawings, Figure 1 is a plan view of the operating parts of the controller, the casing and shafts being in section. Fig. 2 is a transverse sectional view of the controller. Fig. 3 is a detail front elevation of the principal devices embodied in the interlocking, reversing, and cut-out mechanism. Fig. 4 is a plan view of a portion of the reversing-switch mechanism. Fig. 5 is an end elevation of the portion of the reversing-switch mechanism shown in Fig. 4. Fig. 6 is a view, partially in plan and partially in section, of the cut-out device. Fig. 7 is a wiring diagram of the controlling system.

The casting 1, constituting the back frame or support on which the operative parts of the controller are mounted, is provided with suitable projecting studs and blocks to constitute supports for the various shafts of the mechanism, and as these parts may be so located and of such dimensions as to be adapted to the mechanism supported thereby they are obviously susceptible of material modifications from what is shown. A front protecting-casing 2 is hinged to the casting 1 in the usual manner, and the controller may also be provided with a top or cap plate (not shown) of usual construction.

The controller is here illustrated as intended for employment in connection with electric brakes, which may be of either the rheostatic or track variety, and the main drum 3 is therefore provided with both power and brake contact pieces or strips, as indicated in Fig. 7. The operation of the electric brakes involves the establishment of a closed circuit, which includes the motors connected in parallel and a suitable resistance, which is gradually cut out by means of the brake-contact strips on the controller-drum, an equalizing connection being also established, all as indicated in Patent No. 611,465, granted September 27, 1898, to the Westinghouse Electric & Manufacturing Company as assignee of Harry P. Davis. This arrangement of circuits for braking purposes is well known in the art, as is also the fact that the motors are reversed in passing from power to brake connection.

The shaft 4, on which the main drum 3 is mounted, is provided with an indicator wheel or disk 5, having the usual notches 6 in its periphery, in which a roller 8 in the end of a pawl 9 is mounted, this roller being drawn into engagement with the periphery of the indicator-wheel by means of a coil-spring 10, as is usual in apparatus of this character.

For the purpose of automatically throwing the reversing-switch when the controller passes from the first power position to the first braking position I provide the wheel 6 with a cam-groove having two concentric portions 11 and 12 at different distances from the shaft 4 and connected by an approximately straight portion 13. Operating in this cam-groove 11 12 13 is a roller 14, which is mounted upon one arm 15 of a jointed lever, the inner end of this arm being pivoted to the controller-frame at 16. The long arm 17 of the jointed lever projects approximately at right angles to the arm 15 and terminates at its free end in a head 18, having an end slot 19 and two edge or transverse slots 20 and 21.

The reversing-switch drum (not shown) is made in two parts, as in Patent No. 611,465, one part being mounted upon a sleeve 22 and the other part upon a shaft 23, which projects through the sleeve 22. The sleeve 22 and the shaft 23 are normally locked together and to an arm 24ª of an operating-head 24 by means of locking-pins 25 and 26, which are held in locking position by springs 25ª and are respectively provided with caps 27 and 28, by means of which they may be withdrawn from locking engagement. When it is desired to cut out either motor, the corresponding locking-pin is withdrawn by means of its cap, and either the shaft or the sleeve, as the case may be, is rotated a sufficient distance to move the contact-pieces of the corresponding drum out of engagement with the corresponding contact-fingers. A lever 29 is provided for moving the shaft 23 and its drum, and a corresponding lever 30 is provided for moving the sleeve 22 and its drum, as above stated. A lug 31 on one arm of each of these levers may be gripped by means of a suitable handle to afford additional leverage in order to move it, as indicated, and the other arm, 32, of each lever is provided with a notch 33, with which engages the rounded end 34 of a bell-crank lever 35. The other arm, 36, of the lever 35 is provided at its free end with a laterally-projecting lug 37, which is moved inward by the operation of either the lever 29 or the lever 30 in cutting out one of the motors into position to engage a stop 37ª on the indicator-wheel 5, and thus prevent movement of the controller-drum through the positions corresponding to parallel connection of the motors. The lever 35 is held in engagement with the levers 29 and 30 by means of a coiled spring 38.

The reversing-switch head 24, above referred to, is provided with two laterally-projecting studs 39, which are respectively in position to coöperate with the lateral slots 20 and 21 in the head 18 of the lever-arm 17. In order to throw the head 18 to the one side or the other for the purpose of engagement with the one or the other of the studs 39, I provide a lever 40, one end of which is broadened to form a head and is provided with three notches 41, 42, and 43. A pawl 44 has at its free end a roller 45, which engages with one of the notches 41, 42, and 43 and is pressed into engagement therewith by the spring 10, one end of which is fastened to the extension 44ª of the pawl 44. It thus tends to hold the lever 40 in whichever position it may be adjusted. The lever 40 is provided at the end opposite the notched head with a stud 46, which is located in the slot 19 in the head 18, and the lever 40 is operated by means of a suitable handle (not shown) attached to the shaft 47, on which the lever is mounted. When the roller 45 of the pawl 44 is in the central notch 42 of the lever 40, as indicated in Fig. 1, the main controller-drum is locked against movement by means of the slots 20 and 21 and the studs 39, and this position of the parts corresponds to zero or off position of the controller-drum. In order to throw the reversing-switch in either direction to insure either forward or backward movement of the vehicle, the lever 40 is correspondingly moved by the reversing-switch handle, and it in turn throws the head 18 either inward or outward, so that one of the studs 39 is in the corresponding lateral slot in the head 18 and the other is free therefrom. The rotation of the main controller-drum then serves, through the cam-groove 11 12 13 and coöperating mechanism, to throw the reversing-switch in the direction desired. As soon as the reversing-switch is thrown by this means, so that the stud 39, which is free from the corresponding slot in the head 18, is moved out of alinement therewith, the reversing-switch is obviously locked against any other movement so long as the stud or roller 14 is in engagement with either of the concentric portions of the cam-groove 11 12 13.

It will be seen from the foregoing description that the mechanism employed affords an extremely simple and effective interlocking connection between the main drum and the reversing-switch drums, so that the main drum can be operated only when the reversing-switch is in one of its operative positions and, on the other hand, so that the reversing-switch can be thrown only when the controller-drum is in its off position. It will also be seen without further explanation that the reversing-switch is thrown whenever the controller-drum is moved from the power to the braking position by reason of the straight portion 13 of the cam-groove of the indicator-wheel.

By referring to Fig. 2 it will be seen that the equalizing-finger 48 is mounted directly upon one of the binding-posts of the terminal board 49. It will also be observed that the fingers 50 at the other side of the drum are so formed and supported that the points of support about which they move are in a plane which is approximately tangential to the surface of the drum at the points where the fingers make contact, thus insuring substantial freedom from buckling action of the fingers in case the coöperating contact-surface on the drum becomes beaded or otherwise roughened in service.

Another feature to be pointed out is that the trolley-finger 51 is so placed as to be remote from the grounded parts of the controller and between two sets of resistance-fingers. (See Fig. 7.) This location of the trolley-finger between the resistance-fingers serves to prevent injury to the controller in case of grounds or short circuits, and is thus a desirable feature.

With reference to the braking system it is to be noted that instead of employing brake-magnets the counter electromotive force of the motors acting as generators may be utilized to effect the braking of the vehicle, as is the case in connection with the controller covered by United States Patent No. 611,465, granted September 27, 1898, to the Westinghouse Electric & Manufacturing Company as assignee of Harry P. Davis.

In Fig. 7 of the drawings I have shown diagrammatically a vehicle equipment comprising two motors 52, four resistance-columns 53, two controllers each of which comprises a main drum 3, fingers 50 and 51, a reversing-switch 54, a current-collecting device 55, and the necessary wires for connecting said parts in proper coöperative relation.

Inasmuch as the arrangement of contact devices and circuits does not differ materially from what is employed in ordinary practice except as regards the location of the fingers, which are directly connected to the current-collecting device, a detailed description of such arrangement would serve no useful purpose and is therefore omitted.

In view of possible variations in the form, dimensions, and relative location of parts within the scope of my invention I desire it to be understood that no limitations are to be imposed except such as may be necessitated by the prior art and expressly included in the claims.

I claim as my invention—

1. A controller for electric motors, comprising a main drum and coöperating fingers and a reversing-switch drum and fingers, the finger of the main switch that is connected to the current-collector being located at an intermediate point between two sets of resistance-fingers.

2. A controller for electric motors, comprising a main switch and a reversing-switch, said main switch having its trolley-finger located at an intermediate point between two sets of resistance-fingers.

3. A power and brake controller for electric motors, comprising a main switch, a reversing-switch and a terminal board and having an equalizing-finger for the brake-circuit that is supported directly by the terminal board and projects back of the controller-drum.

4. A controller for electric motors comprising a drum and a set of contact-fingers, in combination with resistances and a motor, one of said fingers being connected to a supply-circuit, one to the ground, some of the remainder being connected to the resistances and some to the motor, and the finger which is connected to the supply-circuit being located between two sets of resistance-fingers and remote from any grounded connection or exposed frame of the controller.

In testimony whereof I have hereunto subscribed my name this 20th day of June, 1902.

THOMAS S. PERKINS.

Witnesses:
B. B. HINES,
J. C. MORSE.